Oct. 25, 1927.
W. T. WILLIAMS
NUTCRACKER
1,647,029
Filed April 22, 1925
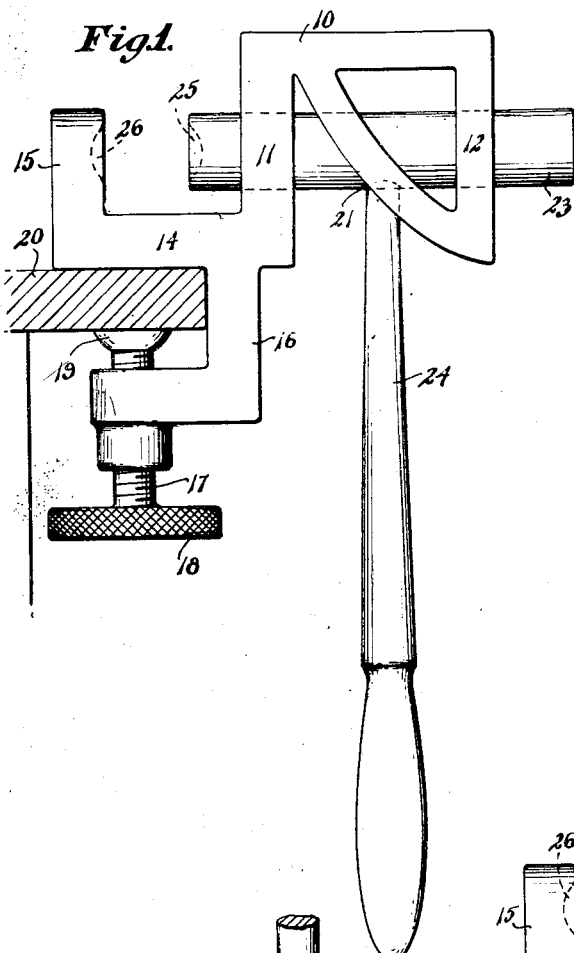
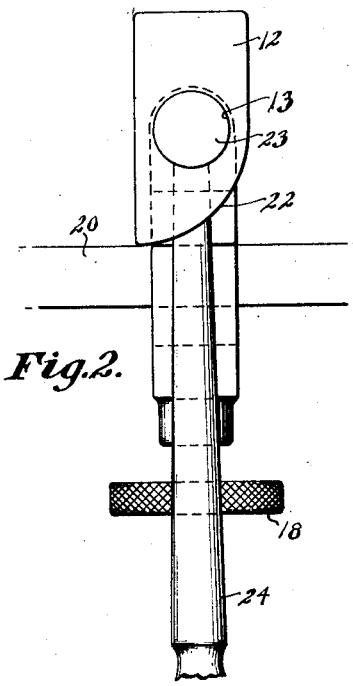
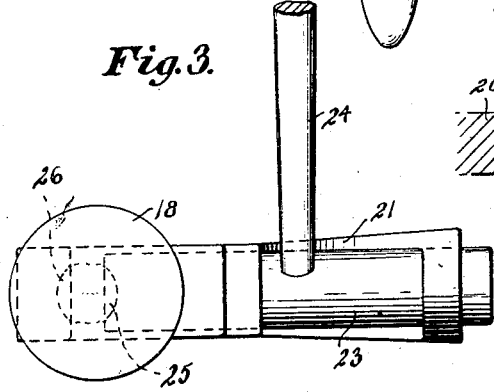
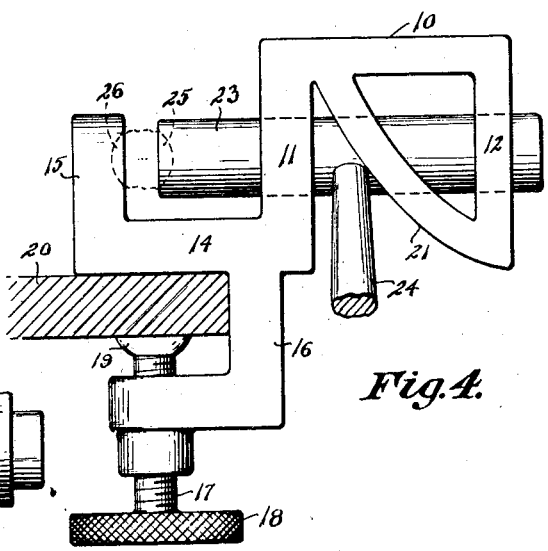
W. T. Williams,
INVENTOR
BY Victor J. Evans,
ATTORNEY
WITNESS:

Patented Oct. 25, 1927.

1,647,029

UNITED STATES PATENT OFFICE.

WILLIAM THOMAS WILLIAMS, OF WACO, TEXAS.

NUTCRACKER.

Application filed April 22, 1925. Serial No. 25,046.

This invention relates to improvements in nut crackers and has for an object the provision of a device by means of which nuts, especially pecans, may be cracked with a minimum amount of effort and damage to the kernel.

Another object of the invention is the provision of a nut cracker which is simple in construction, reliable in use and may be readily attached to a suitable support.

With the above and other objects in view, the invention further includes the following novel features and details of construction, to be hereinafter more fully described, illustrated in the accompanying drawings and pointed out in the appended claims.

In the drawings:—

Figure 1 is a side elevation of a nut cracker constructed in accordance with the invention and shown in position for use.

Figure 2 is an end view of the same.

Figure 3 is a bottom plan view of the nut cracker removed from the support.

Figure 4 is a view similar to Figure 1 illustrating a different position of the plunger.

Referring to the drawings in detail wherein like characters of reference denote corresponding parts, the improved nut cracker as shown comprises a frame 10 which includes a vertically disposed arm 11 and a vertically disposed arm 12, the said arms being spaced apart and provided with openings 13. Connected to the frame by an arm 14 is a vertically disposed abutment 15, the latter being spaced from the arm 11. Extending downwardly from the arm 14 is a substantially L-shaped member 16 which is provided with a threaded opening for the passage of a clamping screw 17, the latter being provided with a knurled head 18 and a swiveled end 19. This swiveled end is adapted to be engaged with a suitable support 20 and the device securely clamped in position for use.

Located between the arms 11 and 12 is a curved arm having a cam face 21, the said face curving inwardly and upwardly, while the lower end of the arm 12 is curved laterally and upwardly as shown at 22 in Figure 2 of the drawings.

Operating within the openings 13 is a cylindrical plunger 23, so that the arms 11 and 12 provide a guide for the plunger. This plunger is provided with an operating handle 24 and has its inner end socketed as shown at 25. The adjacent face of the abutment 14 is also socketed as shown at 26.

In the use of the invention, a nut is positioned between the abutment 14 and the adjacent end of the plunger 23, the opposite ends of the nut being arranged within the depressions 25 and 26 so that the nut is securely held in place. The plunger is rotated by the use of the handle 24, the latter engaging the cam face 21 when the said handle is moved upward. This imparts a rotary movement to the plunger and moves said plunger forward or toward the abutment 15 so that sufficient pressure is brought to bear upon the nut to crack the shell. The handle provides sufficient leverage to crack the shell with a minimum amount of effort with a minimum amount of damage to the kernel of the nut.

The invention is susceptible of various changes in its form, proportions and minor details of construction and the right is herein reserved to make such changes as properly fall within the scope of the appended claims.

Having described the invention what is claimed is:—

1. A nut cracker comprising a base, a clamp depending therefrom, an abutment rising from one end of the base and having a depression in one side thereof, an inverted U-shaped portion rising from the other end of the base, a plunger rotatably and slidably supported on the U-shaped portion, a handle carried by the plunger, and means carried by the U-shaped portion and arranged in the path of said handle whereby the plunger is moved in the direction of the abutment when the handle is elevated to rotate the plunger.

2. A nut cracker comprising a frame including a base, means for clamping the frame to a support, an abutment rising from one end of the base and having a depression in one side thereof, an inverted U-shaped portion supported at the opposite end of the base with one of its sides disposed in confronting relation with said abutment, a plunger slidably and rotatably supported by said U-shaped portion and having a depression formed in one end thereof, a handle projecting centrally from the plunger, and a curved strip arranged diagonally in said U-shaped portion and constituting a cam surface to be engaged by said handle when the plunger is rotated, and force the plunger in the direction of the abutment.

In testimony whereof I affix my signature.

WILLIAM THOMAS WILLIAMS.